United States Patent
Matsuda

(10) Patent No.: US 11,494,279 B2
(45) Date of Patent: Nov. 8, 2022

(54) DEVICE DIAGNOSTIC WEB SYSTEM, DEVICE DIAGNOSTIC METHOD AND PROGRAM STORAGE MEDIUM

(71) Applicant: CANON KABUSHIKI KAISHA, Tokyo (JP)

(72) Inventor: Kotaro Matsuda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 369 days.

(21) Appl. No.: 16/552,281

(22) Filed: Aug. 27, 2019

(65) Prior Publication Data
US 2020/0081811 A1 Mar. 12, 2020

(30) Foreign Application Priority Data

Sep. 11, 2018 (JP) .............................. JP2018-169806

(51) Int. Cl.
*G06F 3/06* (2006.01)
*G06F 13/40* (2006.01)
(Continued)

(52) U.S. Cl.
CPC ............ *G06F 11/2294* (2013.01); *G06F 3/14* (2013.01); *G06F 11/2733* (2013.01);
(Continued)

(58) Field of Classification Search
CPC .................................................. G06F 3/0482
See application file for complete search history.

(56) References Cited

U.S. PATENT DOCUMENTS 7,712,131 B1 * 5/2010 Lethe ..................... G06F 21/57
726/20
7,788,425 B2 * 8/2010 Ikemoto .................. G06F 21/57
710/36
(Continued)

FOREIGN PATENT DOCUMENTS

JP 2002-373081 A 12/2002
JP 2004-112715 A 4/2004
(Continued)

OTHER PUBLICATIONS

Press Release: 'Launch of "Smartphone Ansin Remote Support,"' Jan. 24, 2012, https://www.docomo.ne.jp/iufu/news_release/2012/01/24_02.html#~text=.

*Primary Examiner* — Henry Tsai
*Assistant Examiner* — Juanito C Borromeo
(74) *Attorney, Agent, or Firm* — Venable LLP

(57) ABSTRACT

A device diagnostic web system that diagnoses a device locally connected to an information processing apparatus. In order to confirm whether or not access by the browser is to be permitted by connecting the device to the information processing apparatus via a local connection such as USB or Bluetooth, and executing a device diagnostic web application by a browser installed on this information processing apparatus, a confirmation screen for prompting a user to perform an operation of the information processing apparatus is displayed on the information processing apparatus, if the user permits the access, the device is communicatively connected to the browser to access the device and predetermined device information is acquired and diagnostic information is generated by using the acquired device information.

8 Claims, 18 Drawing Sheets

(51) Int. Cl.
*G06F 11/22* (2006.01)
*G06F 11/273* (2006.01)
*G06F 3/14* (2006.01)
*G06F 13/42* (2006.01)
*H04W 4/80* (2018.01)

(52) U.S. Cl.
CPC .. *G06F 13/4282* (2013.01); *G06F 2213/0042* (2013.01); *H04W 4/80* (2018.02)

(56) References Cited

U.S. PATENT DOCUMENTS

| | | | |
|---|---|---|---|
| 8,069,281 B2 | 11/2011 | Ikemoto | |
| 9,076,103 B2* | 7/2015 | Matsuda | H04N 1/00899 |
| 9,158,721 B2 | 10/2015 | Suwabe | |
| 2015/0180875 A1 | 6/2015 | Kay | |
| 2015/0228127 A1* | 8/2015 | Ross | G07C 5/0808 |
| | | | 701/31.4 |

FOREIGN PATENT DOCUMENTS

| | | |
|---|---|---|
| JP | 2004-240498 A | 8/2004 |
| JP | 2006-185218 A | 7/2006 |
| JP | 2010-191717 A | 9/2010 |
| JP | 2014-032563 A | 2/2014 |
| JP | 2017-100355 A | 6/2017 |

* cited by examiner

```
BROWSER
https://printer.ddd.com/diagnosis/user_mode/
```

DEVICE DIAGNOSTIC APPLICATION (USER MODE)

☐ DEVICE INFORMATION

| MANUFACTURER'S NAME | Ddd |
|---|---|
| PRODUCT NAME | Ddd Printer Model 9 |
| SERIAL NUMBER | ABC12345 |

☐ NETWORK SETTING

| WIRELESS LAN | VALID |
|---|---|
| SSID | abc-office-wireless |
| IP ADDRESS | 192.168.1.101 |
| INTERNET CONNECTION | UNABLE TO CONNECT |

[ SETTING ] [ STATUS ]
   501        502

```
BROWSER
https://printer.ddd.com/diagnosis/user_mode/
DEVICE DIAGNOSTIC APPLICATION (USER MODE)
☐ NETWORK SETTING CHANGE
```

| WIRELESS LAN | ⊙ VALID   ○ INVALID | |
|---|---|---|
| SSID | abc-office-wireless | SELECT OR INPUT |
| IP ADDRESS | ⊙ DHCP   ○ MANUAL INPUT | |

611

[SETTING]  [CANCEL]

```
BROWSER
https://printer.ddd.com/diagnosis/user_mode/
DEVICE DIAGNOSTIC APPLICATION (USER MODE)
☐ STATUS
```

2017-11-01T08:05:31.021 (INFO)Started network adaptor.
2017-11-01T08:05:35.182 (INFO)Connected wireless network ssid=abc-office-wireless.
2017-11-01T08:05:37.854 (INFO)DHCP IP address is assigned 192.168.1.101.
2017-11-01T08:05:50.229 (ERROR)Failed to connect internet.

[RETURN]

```
BROWSER
https://printer.ddd.com/diagnosis/service_mode/
DEVICE DIAGNOSTIC APPLICATION (SERVICE MODE)
☐ DEVICE INFORMATION
```

| MANUFACTURER'S NAME | Ddd |
|---|---|
| PRODUCT NAME | Ddd Printer Model 9 |
| SERIAL NUMBER | ABC12345 |

☐ NETWORK SETTING

| WIRELESS LAN | VALID |
|---|---|
| SSID | abc-office-wireless |
| IP ADDRESS | 192.168.1.101 |
| INTERNET CONNECTION | UNABLE TO CONNECT |

SETTING  STATUS  DIAGNOSIS
701      702     703

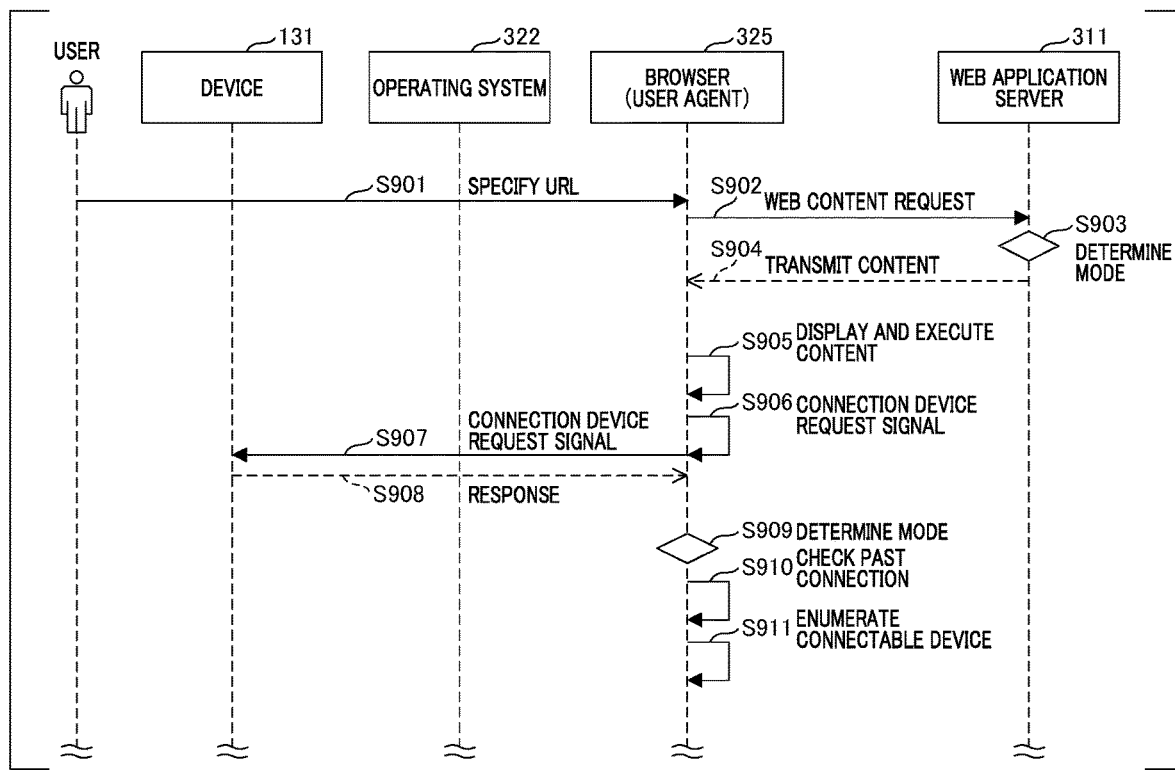

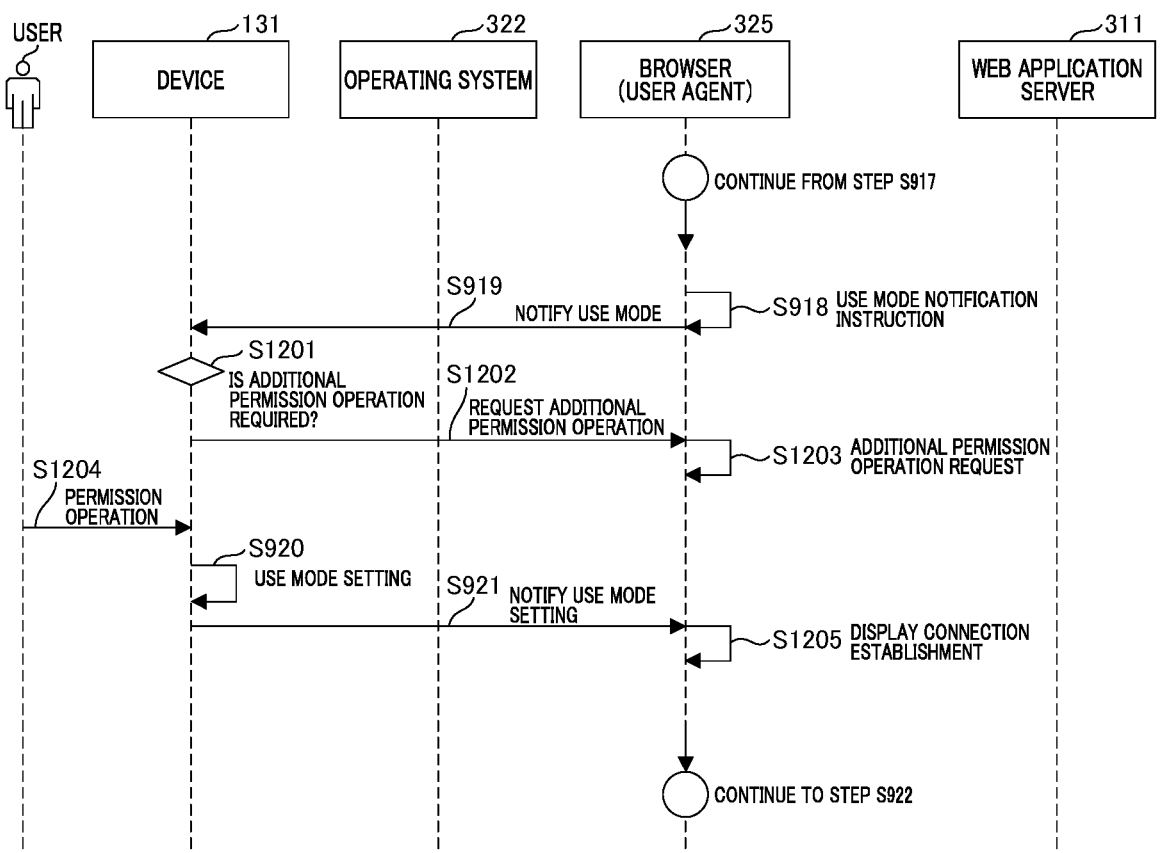

```
BROWSER
``` https://printer.ddd.com/diagnosis/repair_report/

DEVICE DIAGNOSTIC APPLICATION (MAINTENANCE REPORT)

| DATE AND TIME | PRODUCT NAME | SERIAL NUMBER |
|---|---|---|
| 2017/11/1 9:53 | Ddd Printer Model 9 | ABC12345 |

☐ DETAILS

BEFORE SETTING CHANGE

| WIRELESS LAN | VALID |
|---|---|
| SSID | abc-office-wireless |
| IP ADDRESS | 192.168.1.101 |
| INTERNET CONNECTION | UNABLE TO CONNECT |

| WIRELESS LAN ADAPTOR | XYZ Wi-Fi Model 103 |
|---|---|
| DRIVER VERSION | 12.0.8 |
| LINK SPEED | AUTOMATIC |
| USE CHANNEL | 7 ch |

AFTER SETTING CHANGE

| WIRELESS LAN | VALID |
|---|---|
| SSID | abc-office-wireless |
| IP ADDRESS | 192.168.1.101 |
| INTERNET CONNECTION | CONNECTION SUCCESSFUL |

| WIRELESS LAN ADAPTOR | XYZ Wi-Fi Model 103 |
|---|---|
| DRIVER VERSION | 12.0.8 |
| LINK SPEED | AUTOMATIC |
| USE CHANNEL | 11 ch |

[ RETURN ]

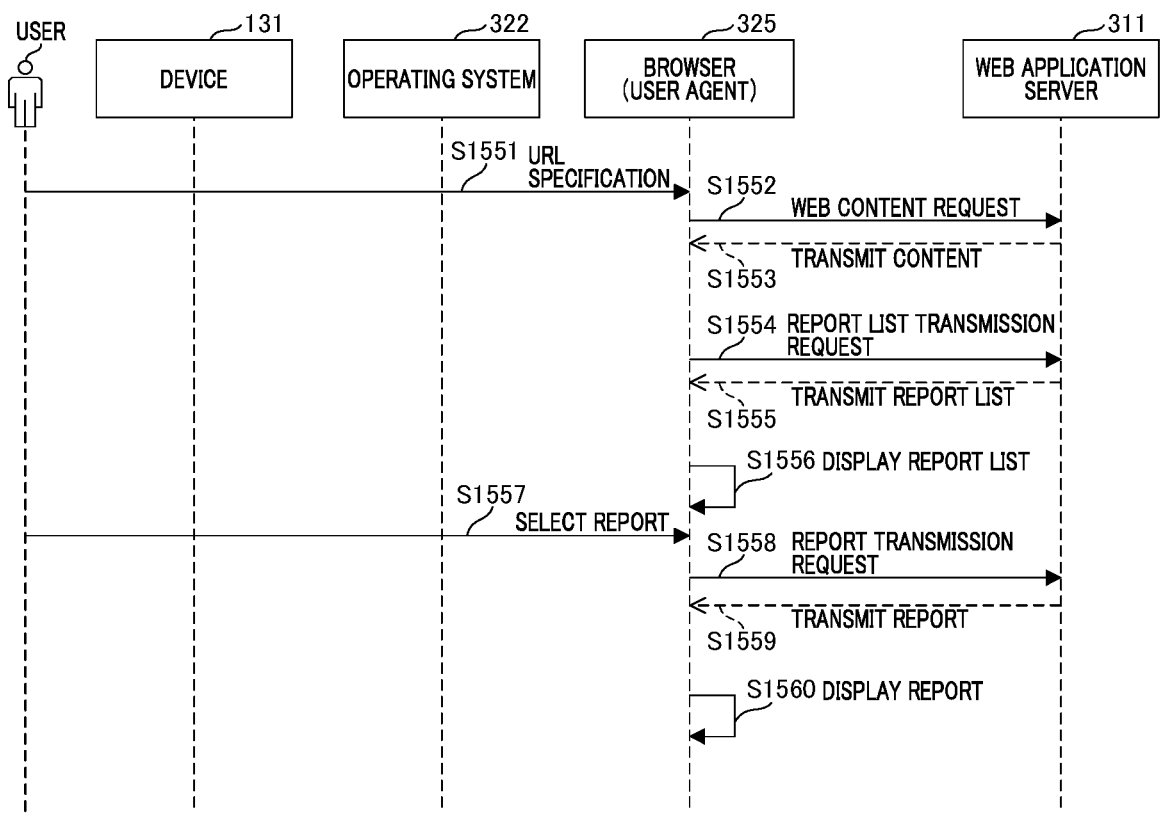

FIG. 18

```
                                    1600
                                      (
┌─────────────────────────────────────────────────────┐
│                      BROWSER                        │
│ ┌─────────────────────────────────────────────────┐ │
│ │ https://192.168.101.1/                          │ │
│ └─────────────────────────────────────────────────┘ │
│ ┌─────────────────────────────────────────────────┐ │
│ │ Ddd Printer Model9 > LOCAL WEB UI               │ │
│ └─────────────────────────────────────────────────┘ │
│                                                     │
│  ☐ DEVICE INFORMATION                               │
│  ┌──────────────────────┬───────────────────────┐   │
│  │ SERIAL NUMBER        │ ABC12345              │   │
│  └──────────────────────┴───────────────────────┘   │
│                                                     │
│  ☐ USE STATUS                                       │
│  ┌────────────────────────────────┬──────────────┐  │
│  │ TOTAL NUMBER OF PRINTING PAGES │ 70255        │  │
│  │ TONER REMAINING AMOUNT (Black) │ Low / 8%     │  │
│  │ TONER REMAINING AMOUNT (Cyan)  │ Normal / 95% │  │
│  │ TONER REMAINING AMOUNT (Magenta)│ Normal / 85%│  │
│  │ TONER REMAINING AMOUNT (Yellow)│ Normal / 70% │  │
│  │ ERROR OCCURRED                 │ CALIBRATION ERROR │
│  └────────────────────────────────┴──────────────┘  │
│                                                     │
│      IF YOU WANT TO DIAGNOSE ERRORS, YOU CAN EXECUTE│
│      DIAGNOSTIC WEB APPLICATION ON THE INTERNET.    │
│      https://printer.ddd.com/diagnosis/             │
│                                              \      │
└─────────────────────────────────────────────────────┘
                                               1601
```

DEVICE DIAGNOSTIC WEB SYSTEM, DEVICE DIAGNOSTIC METHOD AND PROGRAM STORAGE MEDIUM

BACKGROUND OF THE INVENTION

Field of the Invention

The present invention relates to a technique that performs device diagnostics by executing a web application. More specifically, the present invention relates to a device diagnostic web system in which a device is locally connected to a computer by using, for example, a USB connection or a Bluetooth (registered trade mark) connection and diagnosed using a web application, and a device diagnostic method and a program storage medium to achieve such a system.

Description of the Related Art

In recent years, there has been a growing need to use a web application in place of a native application for diagnosing a device that is locally connected to a computer by using, for example, a USB connection or a Bluetooth connection. If the device can be diagnosed by using the web application, the cost and labor required for the diagnosis can be reduced.

For example, in the case of USB connection, in order to access a USB device from a computer, it has been necessary to install a driver for the USB device in an operating system (OS) of the computer and to access the USB device from a native application operating on the operating system.

For this reason, in order for the web application to access the USB device that is connected to the computer, it is necessary to perform a complicated work such as installing a dedicated plug-in for causing the web application to use a driver installed in the OS.

Japanese Patent Laid-Open No. 2004-240498 discloses a system in which a computer acquires a diagnostic application from a web server, transmits the diagnostic application to a device, and receives the result for executing the diagnostic application. The system of Japanese Patent Laid-Open No. 2004-240498 has the disadvantages of a large burden on the human resources and a large burden on the processing capacity of the device in using the system, for example, the necessity of installing a dedicated plug-in in a browser in advance, and the necessity of transmitting a diagnostic application to the device and executing the application.

In contrast, in recent years, technologies such as Web USB API and Web Bluetooth API have been proposed. According to these techniques, a device connected to the computer can be directly accessed from the web server. Among them, the Web USB is proposed to be adapted as a web standard by World Wide Web Consortium.

In Web USB and Web Bluetooth, a program for using a device driver is provided as a Java Script (registered trademark) program, instead of a conventional browser plug-in. Hence, a user can access a USB device and a Bluetooth device connected to the computers simply by executing a program downloaded from a Web site into the browser.

For this reason, there is a need for a technique that reduces the human burden and the burden on the processing capability of the device in diagnosing the device by using Web USB or Web Bluetooth.

Additionally, a conventional device locally connected to a computer has disadvantages of difficulty in providing a sufficiently excellent user interface (UI) used for the diagnosis.

For example, there is a use case in which, if the network connection of a printer to a wireless LAN fails, it is desired to diagnose the setting information and internal data of the printer for investigation and recovery. However, in a small-sized apparatus such as a printer, although a small-sized user interface (UI) is provided, the usability is poor, and in particular, operability and visibility of a diagnostic UI used by a maintenance person are generally very poor. Additionally, many devices referred to as, for example, "IoT devices" are very small in size (for example, a palm-sized single-board computer), but many of these small devices do not have a UI and need to be connected to a USB port or the like during diagnosis.

SUMMARY OF THE INVENTION

The present invention provides a device diagnostic technique that can diagnose a devices locally connected to a computer with little effort and at low cost.

Additionally, the present invention provides a device diagnostic technique that is easy to use for device users and maintenance personnel and facilitates provide a user interface having excellent extensibility and flexibility.

Furthermore, the present invention provides a highly versatile device diagnostic technique that can be applied to various devices by configuring such device diagnostic techniques with only standardized (or virtually standardized) web techniques or extensions thereof.

A device diagnostic web system according to an embodiment of the present invention is a system including an information processing apparatus that executes a web browser and a device, comprising: a display unit configured to display a confirmation screen by the web browser on which whether or not a web application executed in the web browser is to be permitted to access the device is confirmed after the information processing apparatus and the device are connected via USB or Bluetooth; and an acquisition unit configured to acquire device information from the device in accordance with a script corresponding to the web application permitted via the confirmation screen; wherein the web application provides a function for diagnosing the device by using the acquired device information.

According to the present invention, it is possible to provide a device diagnostic technique that can perform diagnosis of a device locally connected to an information processing apparatus with little effort and at low cost.

In addition, the device diagnostic technique according to the present invention can provide a user interface that is easy to use for device users and maintenance personnel and has excellent extensibility and flexibility.

Furthermore, according to the present invention, it is possible to provide a diagnostic technique having a highly versatile device that can be applied to various devices by configuring such device diagnostic technique with only standardized (or virtually standardized) web technique or its extension.

Further features of the present invention will become apparent from the following description of exemplary embodiments with reference to the attached drawings.

BRIEF DESCRIPTION OF THE DRAWINGS

FIG. 5 is a conceptual diagram illustrating an example of a browser display screen during execution of the diagnostic web application according to the first embodiment.

FIGS. 6A and 6B are conceptual diagrams illustrating an example of a browser display screen during execution of the diagnostic web application according to the first embodiment.

FIG. 7 is a conceptual diagram illustrating an example of a browser display screen during execution of the diagnostic web application according to the first embodiment.

FIG. 9 is a flowchart for explaining an execution process of the diagnostic web application according to the first embodiment.

FIG. 13 is a flowchart for explaining the execution process of the diagnostic web application according to the second embodiment.

FIG. 15 is a conceptual diagram illustrating an example of the browser display screen during execution of the diagnostic web application according to the third embodiment.

FIG. 17 is a flowchart for explaining the execution process of the diagnostic web application according to the third embodiment.

FIG. 18 is a conceptual diagram illustrating an example of the display screen of the device during execution of the diagnostic web application according to the third embodiment.

DESCRIPTION OF THE EMBODIMENTS

Hereinafter, the best mode for carrying out the present invention will be described by using the drawings.

First Embodiment

Figure 1:
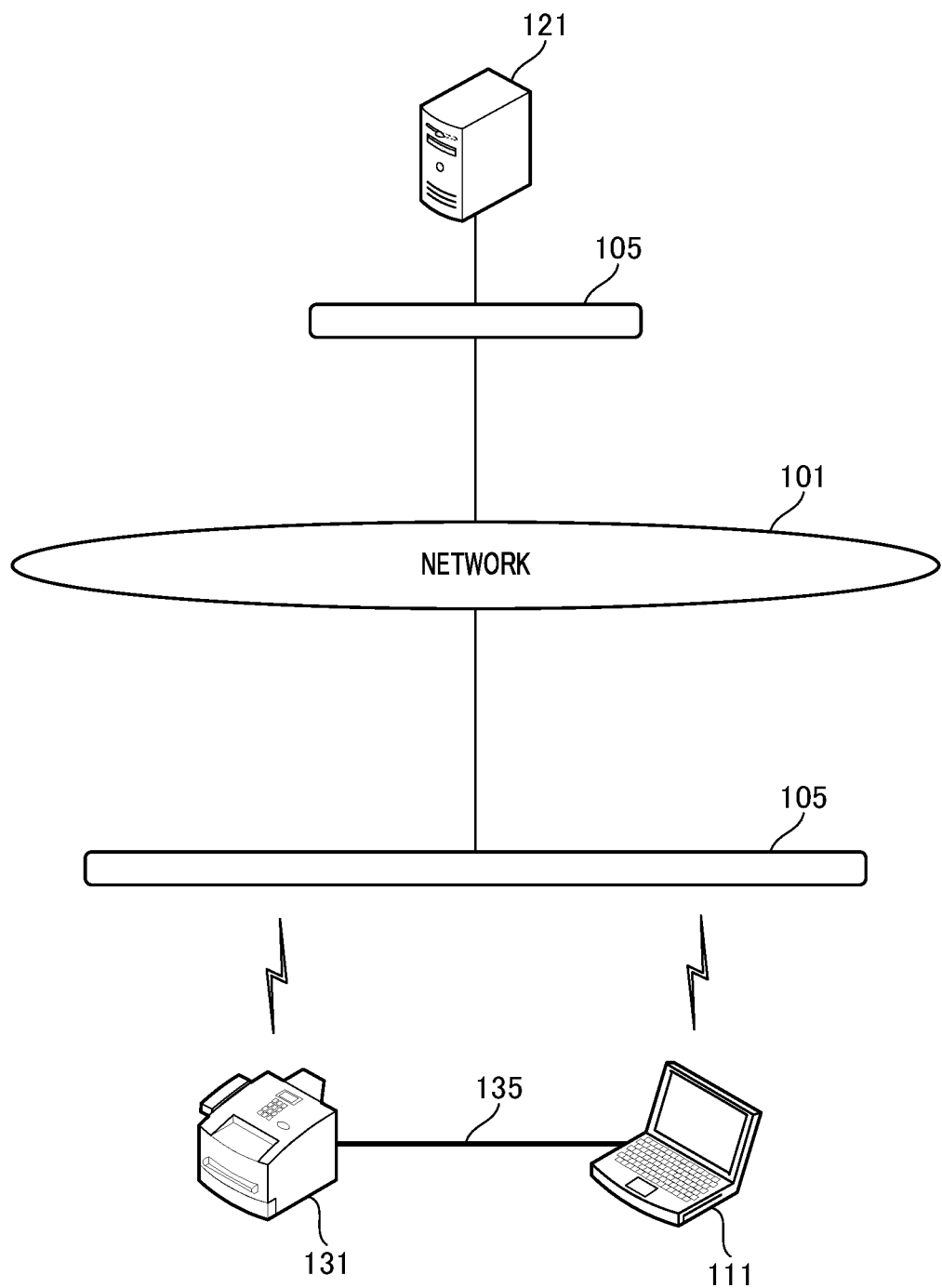
FIG. 1 is a conceptual diagram illustrating a system configuration and a network configuration of a device diagnostic web system according to the first embodiment of the present invention.

FIG. 1 is a conceptual diagram illustrating a system configuration and a network configuration of a device diagnostic web system according to the present embodiment.

In FIG. 1, a network 101 is a wide area network such as the interne or an intranet.

Networks 105 are terminal networks that connect devices such as computers, and are interconnected via the network 101 described above. The networks 105 may be, for example, wired communication networks such as private networks or local area networks (LAN), or may be wireless communication networks such as a wireless LANs or a mobile telephone communication networks.

A computer 111 may be, for example, a personal computer, a laptop computer, a tablet computer, or a smartphone, or may be a computer of another form and another type.

A server 121 provides an application to a computer 111 via the networks 101 and 105.

A device 131 is used in connection with the computer 111. In the present embodiment, the case in which a network printer is used as the device 131 will be described as an example. As the device 131, in the present invention, various devices that can be connected to the Internet or a mobile network are assumed, and thus, the present invention can be applied to a system using a multifunction machine, a home appliance, a car navigation system, a digital medical device, or the like as the device 131. In addition, the present invention can be applied to a system using a small IoT (Internet of Things) device or the like as the device 131 if the system has a mechanism to be described below.

A USB cable 135 is a communication cable that locally communicably connects the computer 111 and the device 131. In the present embodiment, although a case where the computer 111 and the device 131 are locally connected by using a USB connection in accordance with the USB standard will be described as an example, another communication connection technique such as Bluetooth may be used if it is a local connection, that is, a communication connection that directly transmits and receives data without using a network.

Figure 2:
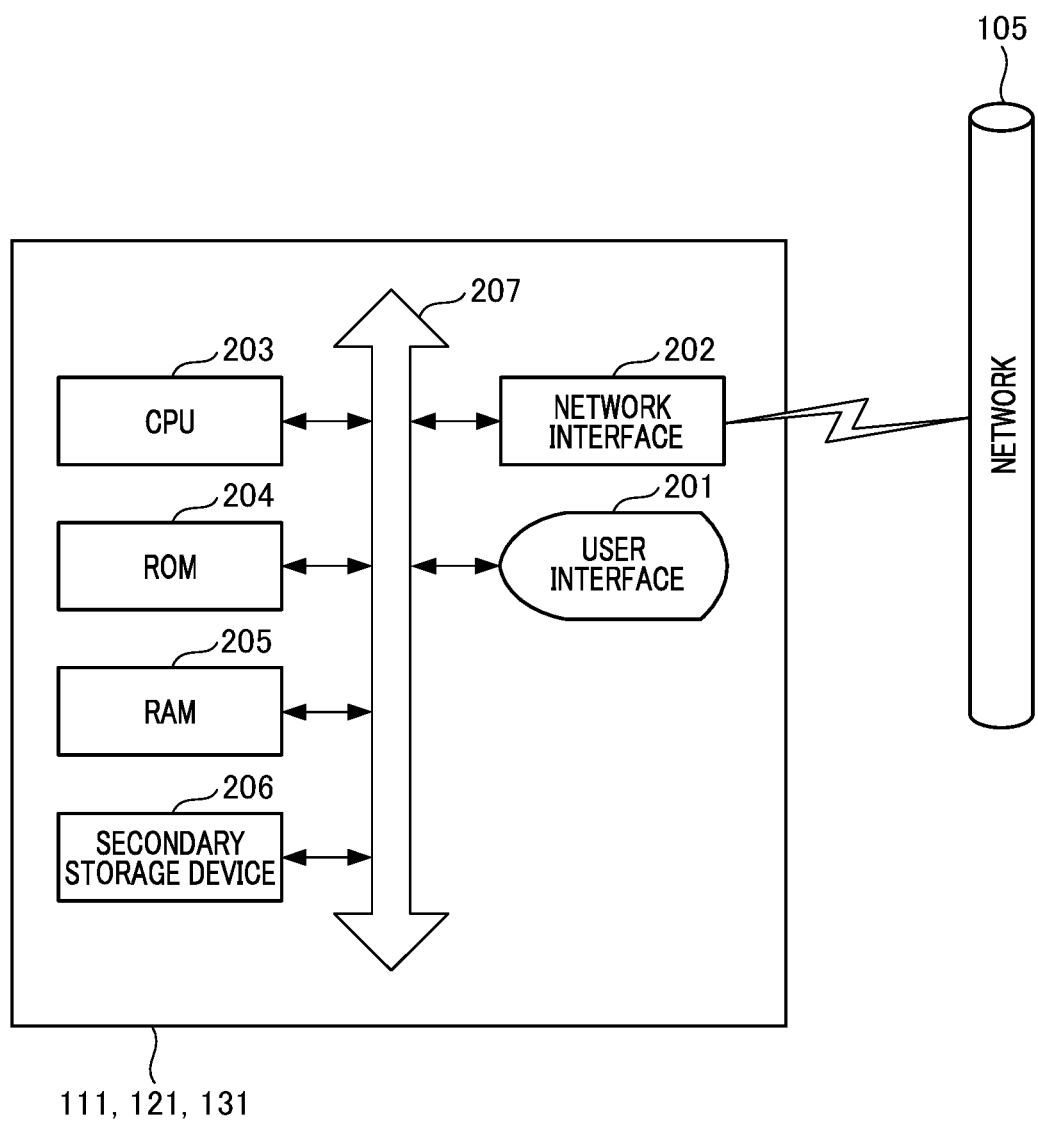
FIG. 2 is a block diagram illustrating a hardware configuration of an information processing function of a computer, a server and a device according to the first embodiment.

FIG. 2 illustrates a hardware configuration of the information processing function of the computer 111, the server 121, and the device 131.

In FIG. 2, a user interface 201 performs input and output of the information and signals by using, for example, a display, a keyboard, a mouse, a button, or a touch panel (not illustrated).

A network user interface 202 is connected to a network such as a LAN to communicate with other computers, network devices and so on. The communication method may be either wired or wireless.

A CPU (Central Processing Unit) 203 executes a program read from a ROM 204, a RAM 205, or a secondary storage device 206, and the like to be described below.

The ROM 204 stores embedded programs and data.

The RAM 205 is a memory used as a temporary memory region of the CPU 203.

The secondary storage device 206 is a storage that stores programs and the like. As the second storage device 206, a hard disk drive (HDD) or a flash memory can be adopted, for example.

Note that it may be possible that a computer that does not include these components 201 to 206 is used and connection and operation are performed from another computer by using, for example, a remote desktop and a remote shell.

An input/output user interface 207 interconnects the components 201 to 206.

Figure 3:
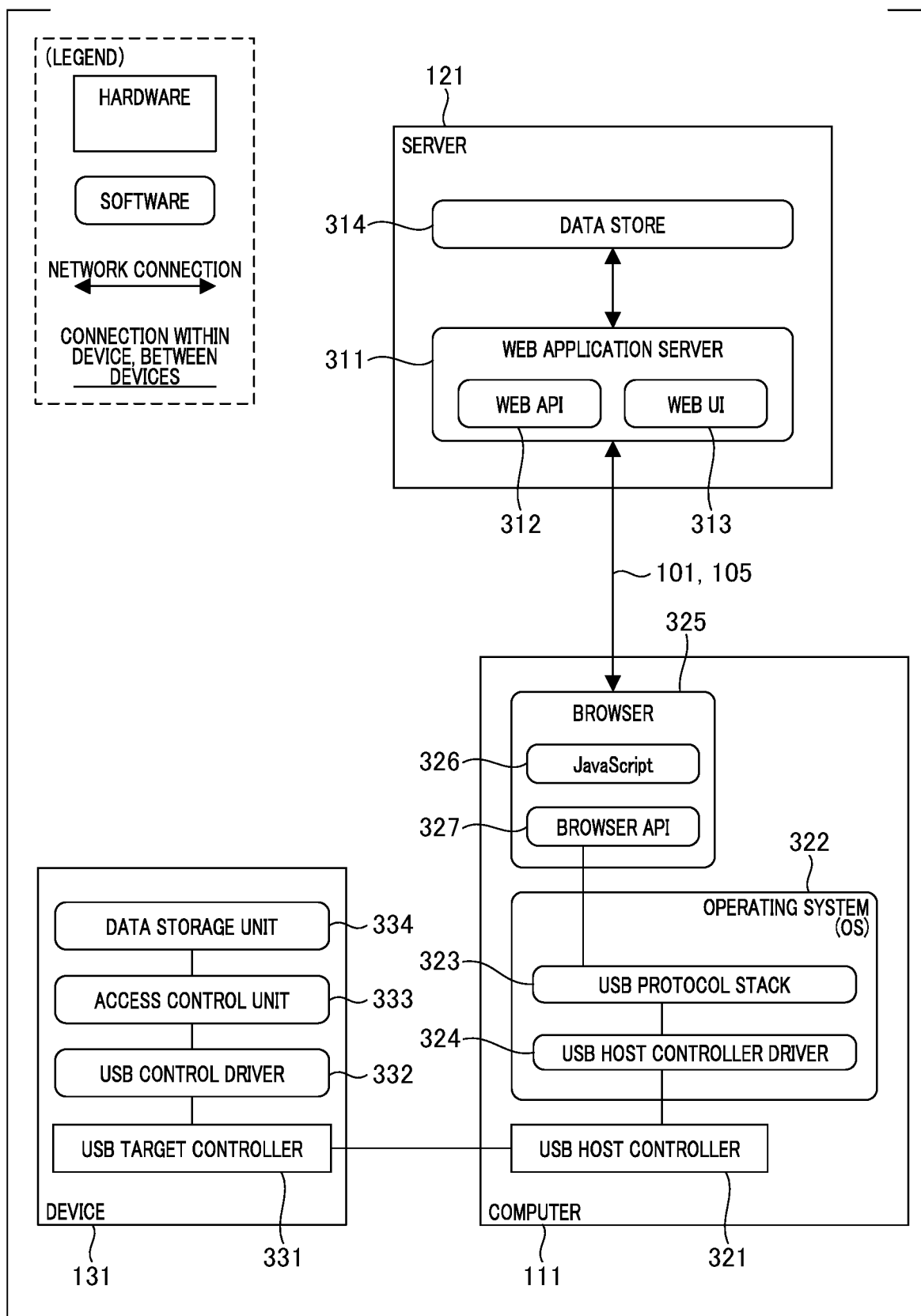
FIG. 3 is a block diagram illustrating a software configuration of an information processing function of the computer, the server and the device according to the first embodiment.

FIG. 3 illustrates a software configuration of the computer 111, the server 121, and the device 131.

The software installed in each of the hardware is each executed by the CPU 203 (see FIG. 2), and is configured to be able to communicate with each other as illustrated by an arrow showing the network connection.

As shown in FIG. 3, the server 121 includes a web application server 311 and a data store 314 as a software configuration.

The web application server 311 has a web API 312 and a web UI 313.

The web API 312 is an application programming interface provided by the web application server 311.

The web UI 313 is a user interface provided by the web application server 311.

The data store 314 saves or stores data to be used by the web application server 311.

When the web application server 311 receives an HTTP request from a client, according to the content of the HTTP request, the web UI 313 transmits a content file such as HTML (Hyper Text Markup Language) or JavaScript, or the web API 312 transmits XML (Extensible Markup Language) or JSON (JavaScript Object Notation) data.

The computer 111 includes an operating system (OS) 322 and a browser 325 serving as a software configuration in addition to a USB host controller 321 serving as a hardware configuration.

The USB host controller 321 performs connection and communication in accordance with the USB standard with the USB target controller provided in the device 131.

The OS 322 manages and controls each piece of hardware of the computer 111 and performs execution management of various programs. This OS 322 has a USB protocol stack 323 and a USB host controller driver 324.

The USB protocol stack 323 includes a program module, a library, and an API, for using the USB protocol.

The USB host controller driver 324 drives and controls the USB host controller 321 based on a command from the USB protocol stack 323.

The browser 325 is software for browsing a web installed in the computer 111. That is, the browser 325 is an application that displays and executes HTML and JavaScript.

Java Script 326 is a program executed on the browser 325. Specifically, the browser 325 acquires, for example, HTML and Java Script 326 from the web application server 311, which is executed by the server 121, via the networks 101 and 105. Then, browser 325 executes the program to perform a predetermined display on a display (not illustrated) of the user interface 201 of the computer 111.

A browser API 327 is an application programming interface included in the browser 325, and enables Java Script 326 that has been executed on the browser to access a function provided to the OS 322.

The device 131 includes a USB target controller serving as a hardware configuration, a USB controller driver 332, an access control unit 333, and a data storage unit 334, serving as a software configuration.

A USB target controller 331 performs connection and communication conforming to the USB standard with the USB host controller 321 provided in the computer 111. The USB controller driver 332 drives and controls the USB target controller 331.

The access control unit 333 controls access permission to the data storage unit 334 and controls reading and writing of necessary data.

The data storage unit 334 stores various data in the device 131.

The device 131 can also have a web server (not illustrated) serving as a software configuration. The web server of the device 131 can provide a web page to a web browser operating on an external PC by using a protocol such as HTTP via a network. In this case, the device 131 provides a web page without passing through the USB controller driver 332 described above.

Hereinafter, in the present invention, an embodiment using an API supported by a web browser that uses USB or Bluetooth will be described. Therefore, it can be said that the present invention is effective in particular in the case where even a device that has a web server and can provide a web page that can be used for maintenance, management, and the like, but cannot perform network connection due to failure or a network prohibited environment.

FIG. 4 to FIG. 8B illustrate screen display examples of a display (not illustrated) provided on the user interface 201 during execution of the diagnostic web application by the browser 325.

Figure 4:
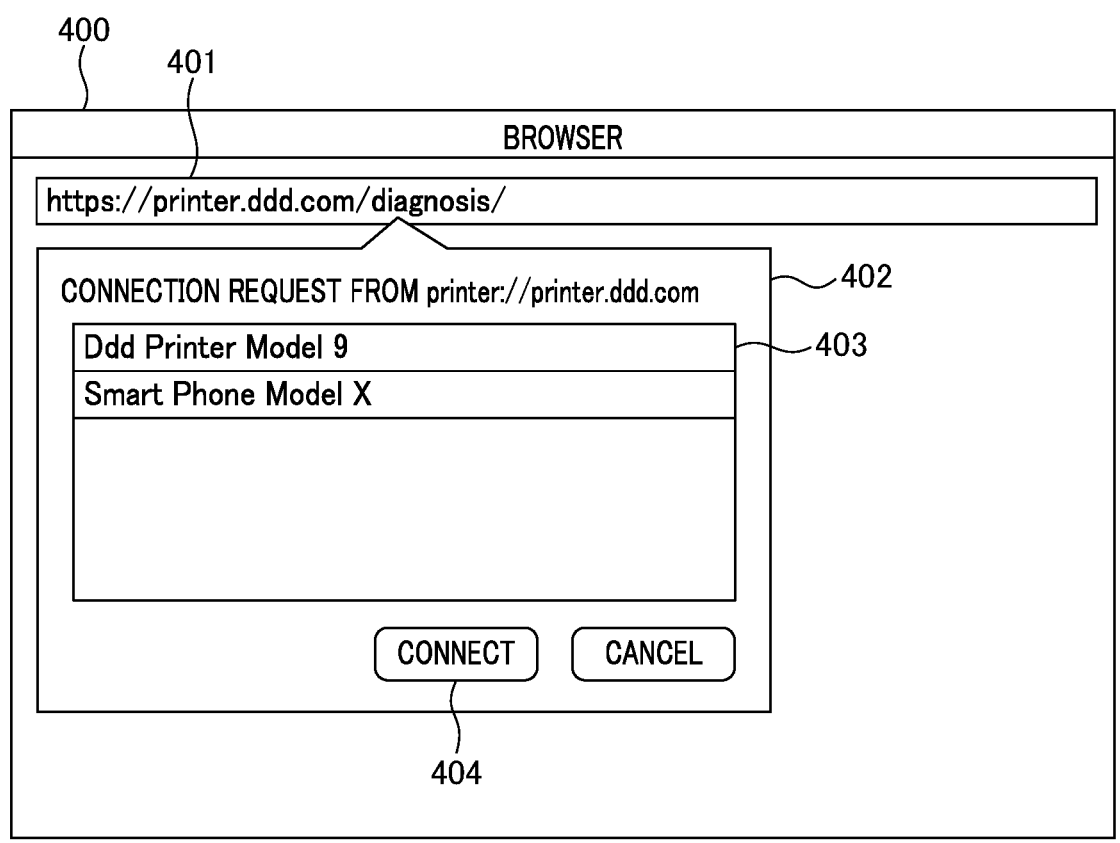
FIG. 4 is a conceptual diagram illustrating an example of a browser display screen during execution of the diagnostic web application according to the first embodiment.

A screen 400 shown in FIG. 4 is a window of the browser 325 during execution and display of the diagnostic web application acquired from the web application server 311 in a state the computer 111 is connected to the server 121.

On the screen 400, a URL input and search field 401 displays the URL of the web application server 311 opened in the browser 325.

A display area 402 displays a connection permission prompt for requesting permission of a user when a domain of the web application server 311 USB-connects with a device which is connected to the computer 111 via the Web USB.

Display items 403 are options of a connection destination device of Web a USB displayed in the display area 402.

A connection permission button 404 is used to have the user execute the Web USB connection permission operation.

FIG. 5 and FIG. 6 illustrate examples of screen displays in a case where the computer 111 is operating in the user mode. The user mode is a mode used by a general user, in other words, a user of the device 131.

A screen 500 shown in FIG. 5 is a diagnostic application screen displayed after connection permission on the screen 400, in the user mode. For example, device information and network settings are displayed on the screen 500.

In the screen 500, a link button 501 (a button displayed as "setting") is used to allow the user to perform an operation of transitioning to a setting value change screen.

In contrast, a link button 502 (a button displayed as "status") is used to allow the user to perform a display operation of a status confirmation screen.

The setting value change screen 610 in FIG. 6A is a transition destination from the link button 501 displayed on the screen 500. On the setting value change screen 610, the user can change the setting value of the network.

A setting button 611 is a button for having the user execute setting value changes.

A status confirmation screen 620 in FIG. 6B is a transition destination from the link button 502 displayed on the screen 500. On the status confirmation screen 620, the log of the network connection status can be browsed.

Figure 8A:
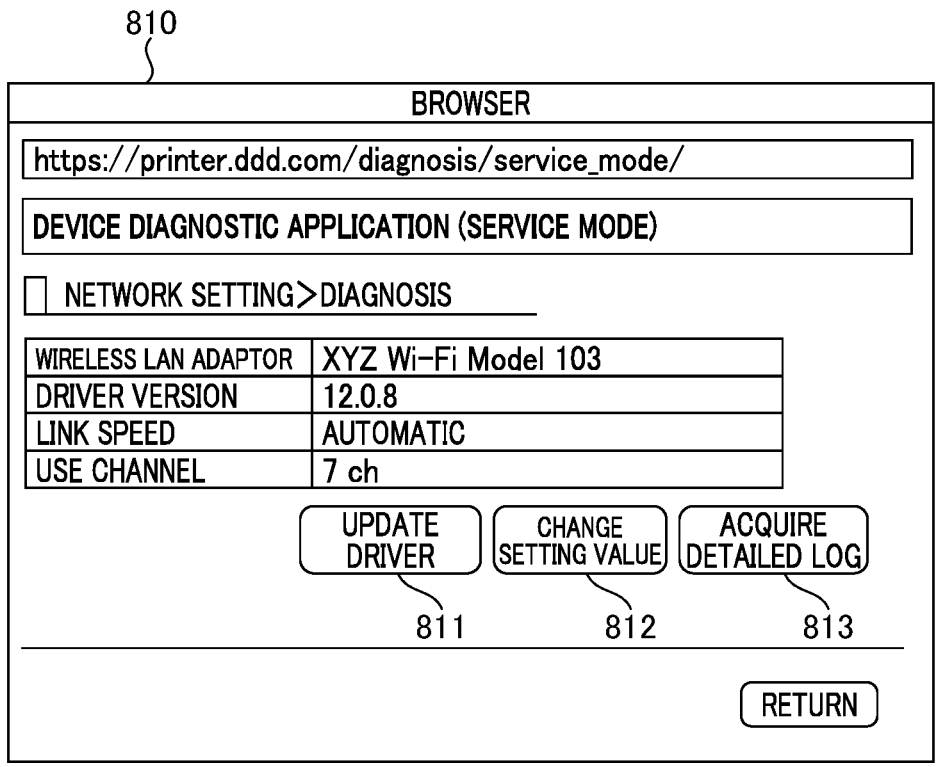
FIGS. 8A and 8B are conceptual diagrams illustrating an example of a browser display screen during execution of the diagnostic web application according to the first embodiment.
Figure 8B:
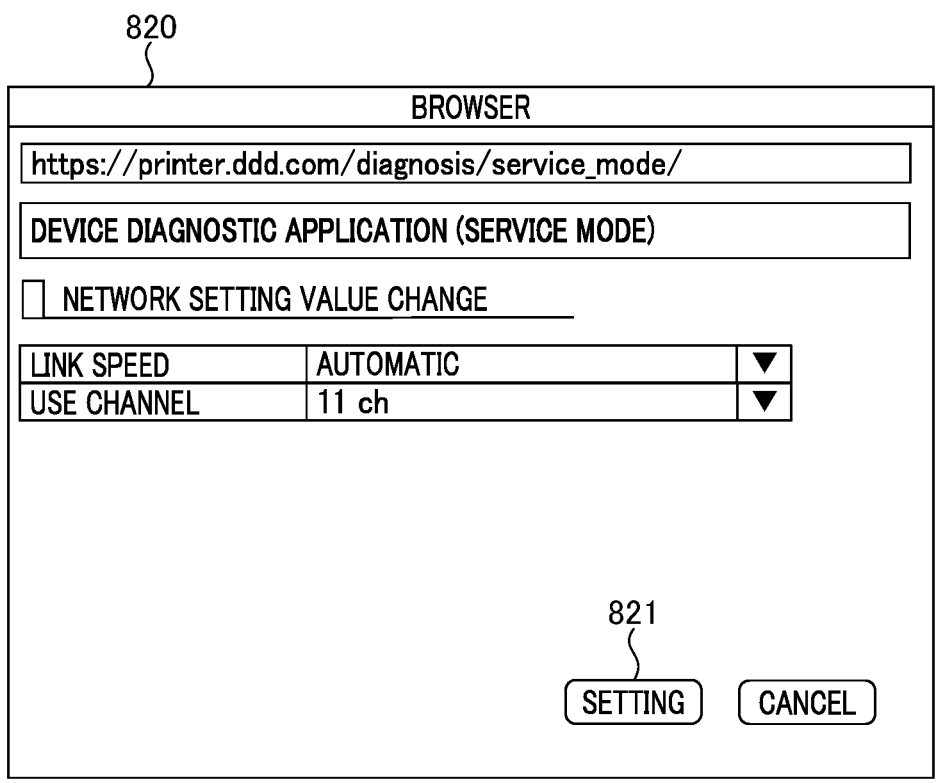

FIG. 7, FIG. 8A, and FIG. 8B are examples of screen display in a case where the computer 111 is operating in the service mode. The service mode is, for example, a mode used by a user that has authority higher than a general user, for example, a person in charge of maintenance of the device 131.

A screen 700 in FIG. 7 is a diagnostic application screen that is displayed after connection permission on the screen 400, in the service mode. The screen 700 displays device information, network settings, and the like.

On the screen 700, the link button 701 is similar to the link button 501 of the screen 500, and is used to have the user perform an operation of transitioning to the setting value change screen 610.

A link button 702 is similar to the link button 502 of the screen 500, and is used to have the user perform a display operation of the status confirmation screen 620.

Further, on the screen 700, a link button 703 for transitioning to a diagnostic screen 810 in FIG. 8A is displayed. This diagnostic screen 810 is a screen that can be displayed and operated only in the service mode.

The diagnostic screen 810 displays various values that can be referred to only in the service mode. Additionally, on the diagnosis screen 810, link buttons 811 to 813 for providing functions that can be performed only in the service mode are displayed.

The link button 811 is used to have the user perform an operation of updating the driver of the network adapter.

The link button 812 is used during transition to a setting value change screen 820 (see FIG. 8B) for changing the setting values displayed on the diagnosis screen 810.

The link button 813 is a button for providing a detailed log acquisition function.

As shown in FIG. 8B, on the setting value change screen 820, the setting of the link speed and the use channel can be changed. As described above, in the service mode, access to a screen on which a more advanced function is executed or a setting value is changed, which is not enhanced in the user mode, is permitted.

Figure 10:
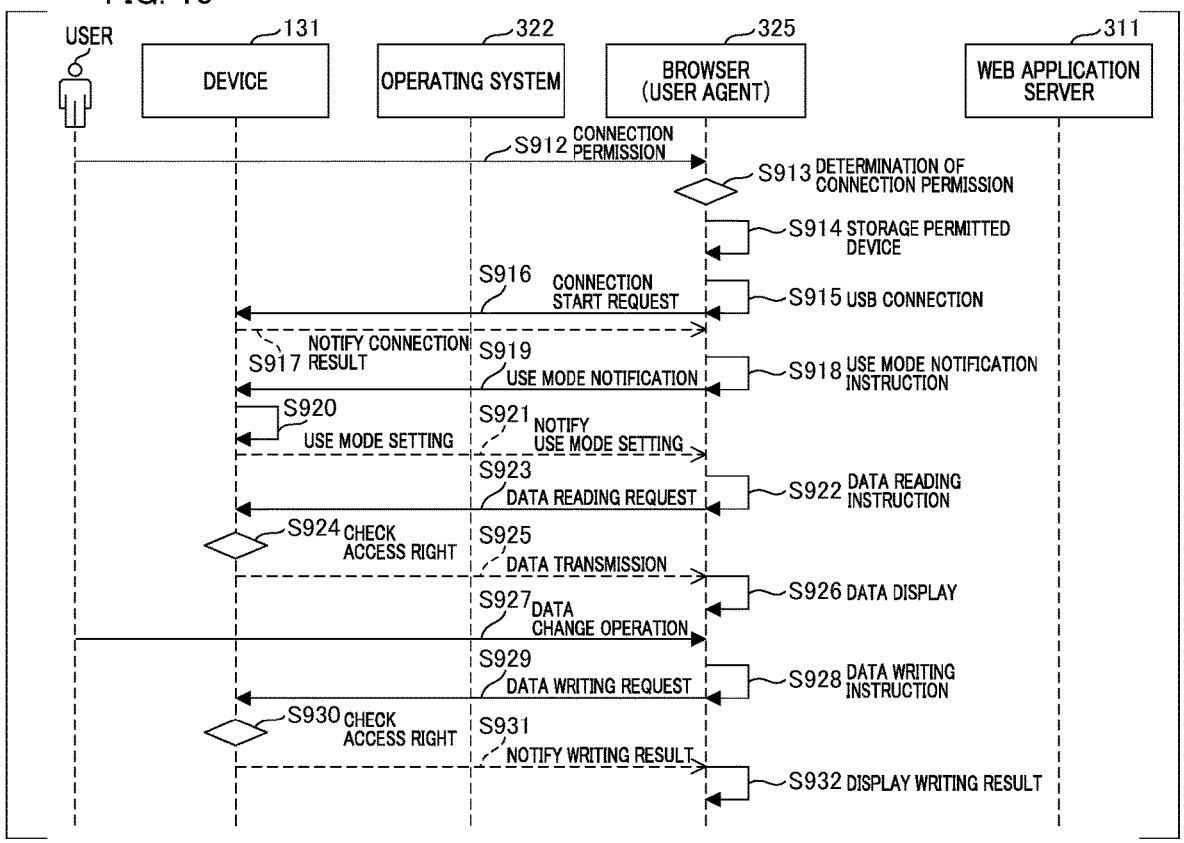
FIG. 10 is a flowchart for explaining the execution process of the diagnostic web application according to the first embodiment.

FIGS. 9 and 10 are flowcharts for explaining the execution process of the diagnostic web application described in FIG. 4 to FIG. 8B.

First, the user designates the URL of the diagnostic web application in the URL input and search field 401 of the browser 325 (S901).

Thus, the browser 325 transmits a web content request to the web application server 311 (S902).

The web application server 311 determines the distinction between the user mode and the service mode based on the web content request that has been received (S903).

This determination of distinction between the user mode and service mode may be performed, for example, based on the difference in the URL of the diagnostic web application.

Additionally, if the web application server 311 includes a user login authentication function, the determination may be performed based on the authority given to the login user. For example, the distinction between a general user and an administrative user may be determined, a user mode may be provided to the general user, and a service mode may be provided to an administration user. Otherwise, the user mode may be provided to the user who has not logged in, and the service mode may be provided to the user who has logged in.

After determining the distinction between the user mode and service mode, the web application server 311 transmits, content such as HTML/JavaScript for a mode corresponding to the determination result to the browser 325 (S904).

The browser 325 displays and executes the received content (S905).

Next, an instruction to transmit "usb. RequestDevice" is provided to the browser API 327 (S906) by executing a program in the Java Script 326 by the browser 325. By this signal, the information for determining the connected device is requested.

Subsequently, the browser 325 transmits this request for enumerating the device 131 that is being currently connected to the computer 111 via the OS 322 (S907).

In response to this, the device 131 transmits the Capability Descriptor from among the USB standard descriptors to the browser 325 (S908).

The browser 325 executes the Java Script 326 program to determine the mode that is being currently used (S909).

Note that an command to request the permission for the USB connection is different between the user mode and the service mode. Specifically, in the case of the user mode, a normal USB connection is requested by using a command, "Permission Name=USB". In contrast, in the case of the service mode, in addition to the normal Web USB connection, the data access level of the diagnostic mode is requested by using the command, "Permission Name =USB, diagnostic-mode =true".

Next, the browser 325 checks whether or not the device 131 has acquired permission for USB connection in the past (S910).

Then, if this time is the first time, the browser 325 enumerates and displays the connection target devices as the display items 403 in the display area 402 of the screen 400 shown in FIG. 4 (S911).

The user selects the desired display item 403, that is, a device to be connected, and then depresses the connection permission button 404 to permit the desired Web USB connection (S912).

Then the browser 325 determines whether or not the Web USB connection has been permitted based on the connection permission prompt of the display area 402 (S913). Subsequently, if the Web USB connection has not been permitted, the browser 325 ends the processing flow. In contrast, if the Web USB connection has been permitted, the browser 325 proceeds to the next step, S914.

The browser 325 stores an information to identify the device that has permitted in step S912 in the USB permission storage as an information to identify a permitted USB device (S914). Thereby, in the request for permission the next time and after, if it is confirmed in step S910 that the permission in the past exists, the connection permission prompt in step S911 may be omitted.

Next, the browser 325 executes the program in the Java Script 326 to provide an instruction to start the USB connection (S915) to the browser API 327.

As a result, the USB connection start request is transmitted from inside the browser 325 to the device 131 via the OS 322 (S916).

The device 131 provides a notification that the connection has started as a response to the browser 325 (S917).

The browser 325 executes the program in the Java Script 326 to provide a notification of a use mode (specifically, the distinguishing between the user mode and the service mode) to the browser API 327 (S918).

As a result, the browser 325 notifies the device 131 about the use mode via the OS 322 (S919).

The access control unit 333 in the device 131 sets the notified use mode to the present communication session (S920).

Then, the result for setting the use mode is transmitted as a response from the device 131 to the browser 325 (S921).

Subsequently, the browser 325 instructs the browser API 327 to read data by executing the program in the Java Script 326 (S922).

As a result, a data read request is transmitted from the browser 325 to the device 131 via the OS 322 (S923).

The access control unit 333 in the device 131 checks whether or not the data requested to be written can be accessed in the use mode set in the current communication session (S924).

Then, if it is determined that the data can be accessed, the access control unit 333 reads out the requested data from the data storage unit 334 and transmits the data to the browser 325 (S925).

The browser 325 displays the read-out data on a display (not illustrated) of the user interface 201 (S926).

Here, if the mode in use is the user mode, in step S926, the screen 500 in FIG. 5 is displayed. Subsequently, also in display of the screens 610 and 620 in FIG. 6, the reading processing similar to steps S922 to S925 is executed in the user mode.

In contrast, if the mode in use is the service mode, the screen 700 in FIG. 7 is displayed in step S926. Subsequently, also in the display of the screens 810 and 820 in FIG. 8A and FIG. 8B, reading processing similar to steps S922 to S925 is executed in the service mode.

Additionally, when the user presses the button 611 or a button 821 on the screen 610 or 820, the operation result is transmitted to the browser 325 (S927), and a data change process from steps S928 to S932 is executed.

In this data change process, first, a program in the Java Script 326 is executed to provide an instruction to write setting data to the browser API 327 (S928).

As a result, a setting data writing request is transmitted from the browser 325 to the device 131 via the OS 322 (S929).

The access control unit 333 in the device 131 checks whether or not the data that is requested to be written can be accessed in the use mode set in the current communication session (S930).

If it is determined the data can be accessed, the access control unit 333 writes the requested data onto the data storage unit 334, and then provides a notification about the writing result to the browser 325 (S931).

Subsequently, the browser 325 displays the received writing result on a display (not illustrated) of the user interface 201 (S932).

As described above, in the present embodiment, the diagnostic web application is provided by the server 121.

In the local web UI or the like in the device 131 described above, update of software is required in order to add functions or fix bugs for embedded software. Additionally, as described above, in many cases, the device 131 does not include a sufficient computer resources for a CPU, storage, or memory and the like in, for example, an IoT device. It is difficult to install a multifunctional and high-functioning application on such a device 131.

In contrast, in the first embodiment of the present invention, since the diagnostic web application is provided by the server 121, the requests for addition and advancement of functions can be responded to only by updating the version of the web API 312 and the web UI 313 of the web application server 311. Therefore, according to the first embodiment of the present invention, it is possible to provide a diagnostic application having a high expansibility and a high flexibility without preparing, for example, a special user interface in the device itself.

Second Embodiment

A second embodiment of the present invention will be described by using FIG. 11A to FIG. 13. The system configuration and the network configuration of the device diagnostic web system according to the present embodiment, and the hardware configuration and the software configuration of the computer 111, the server 121, and the device 131 are similar to those in the first embodiment described above.

In the first embodiment described above, a permission prompt is displayed in the display area 402 of the screen 400 (see FIG. 4) to allow the user to select a device for which the connection of the web USB is permitted (see step S913 in FIG. 10), thereby to be protected from data access by a third party.

In contrast, in the present embodiment, by performing an additional access permission processing procedure after the access permission procedure similar to that in the first embodiment, more robust data access protection than that in the first embodiment is provided.

Figure 11A:
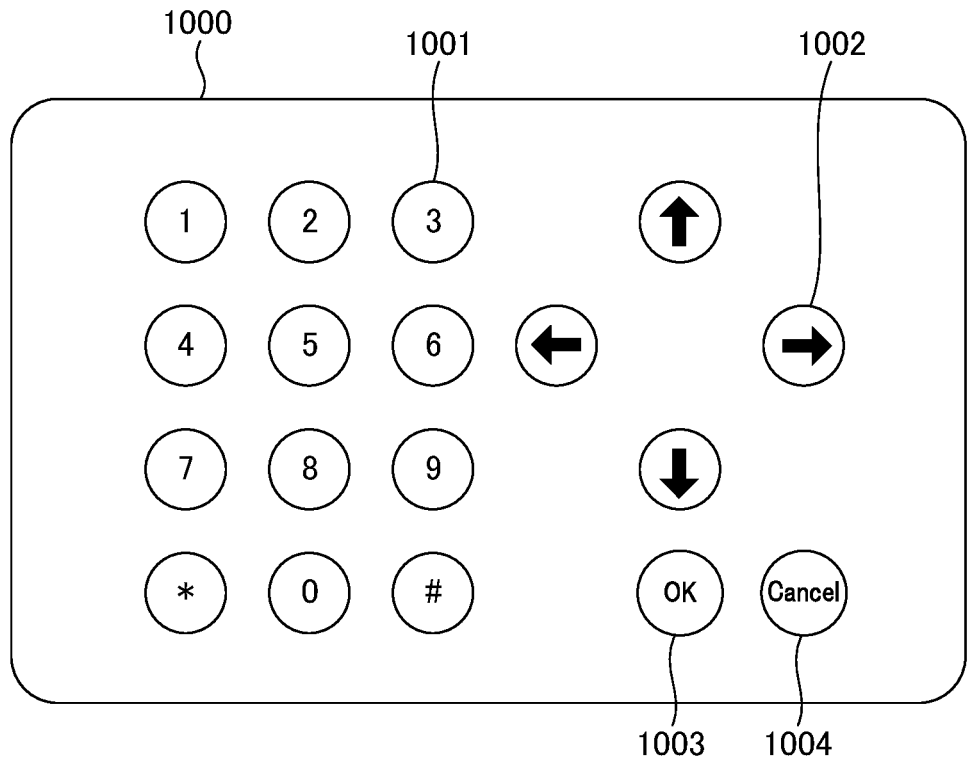
FIG. 11A is a conceptual diagram of an operation panel provided in the device according to the second embodiment.

An operation panel 1000 illustrated in FIG. 11A is an input unit provided in the device 131. This operation panel 1000 is provided with, for example, numeric keys 1001, a direction key 1002, an OK key 1003, and a cancel key 1004.

Figure 11B:
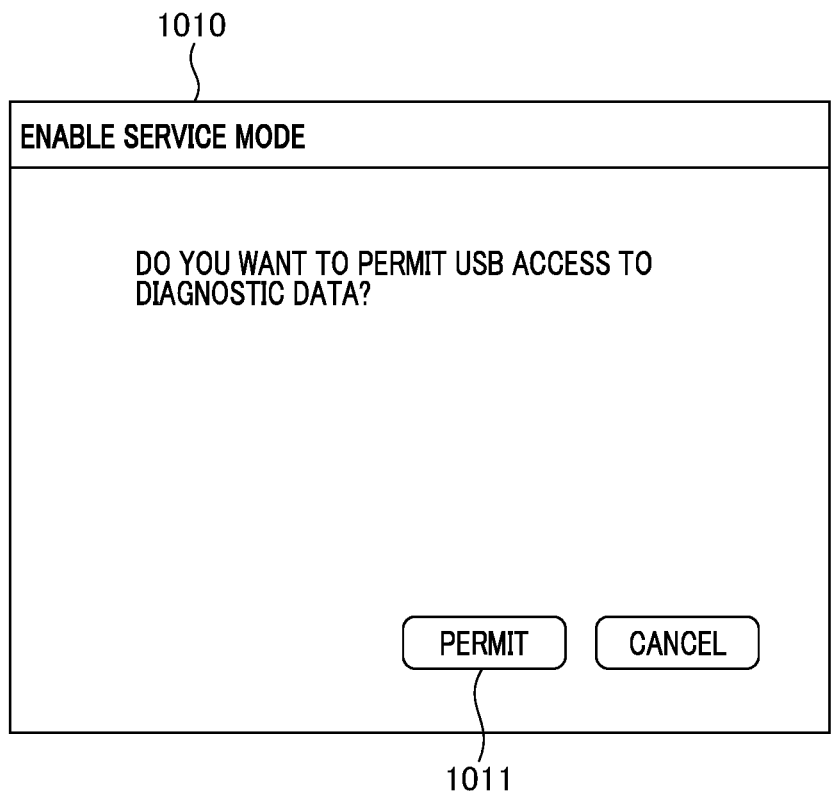
FIG. 11B is a conceptual diagram of a touch display provided in the device according to the second embodiment.

Additionally, a touch panel 1010 shown in FIG. 11B is an input and display unit provided in the device 131. On the touch panel 1010, a permission button 1011 that executes permission for data access in the service mode is displayed.

Figure 12A:
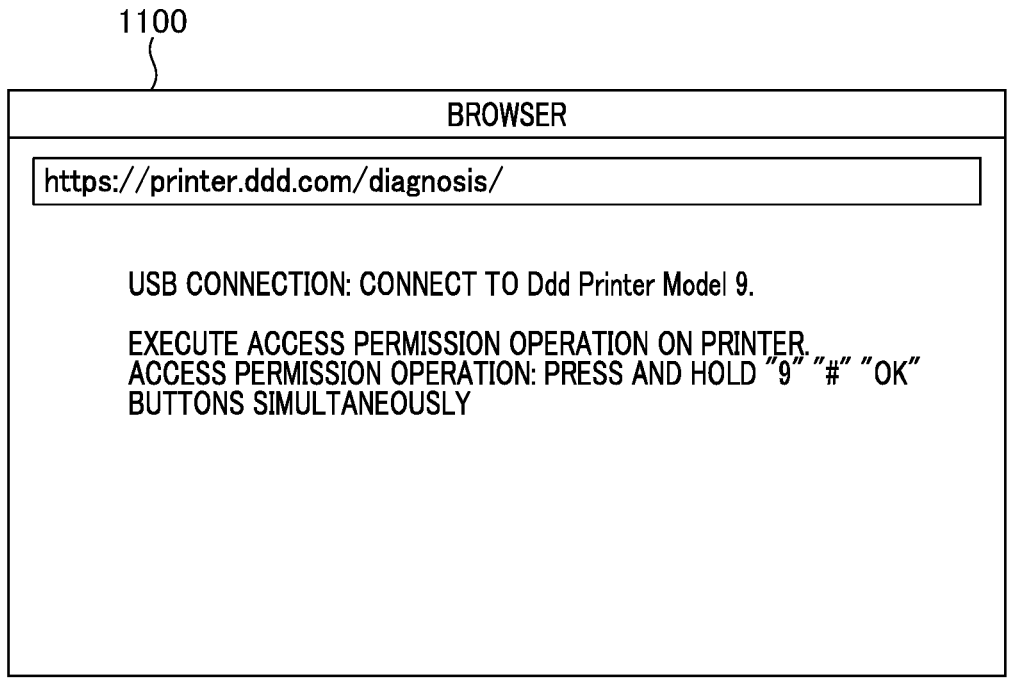
FIGS. 12A and 12B are conceptual diagrams illustrating an example of a browser display screen during execution of the diagnostic web application according to the second embodiment is executed.

FIG. 12A illustrates an example of a screen 1100 that is displayed on the browser 325 and requests an additional access permission operation. In the example of FIG. 12A, the user is required to perform an access authentication operation using any one or more of the keys 1001 to 1004 on the operation panel 1000. The message displayed on the screen 1100 is an example of the case in which the user is made to perform the access permission operation by using the operation panel 1000 in FIG. 11A.

In contrast, if it is desired to have the user perform access permission by pressing the permission button 1011 of FIG. 11B, a message, for example, "Permit data access on touch screen", may be displayed on the screen 1100.

Figure 12B:
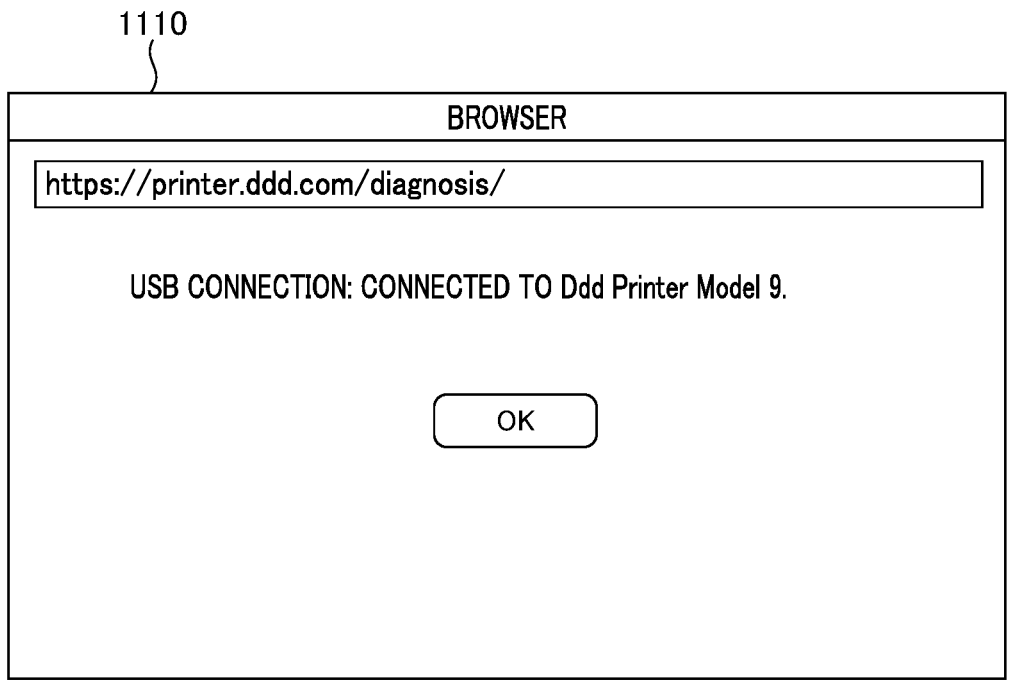

FIG. 12B illustrates an example of a screen 1110 displayed on the browser 325 after the additional access permission operation, which is a display example when the USB connection is established.

FIG. 13 is a flowchart for explaining a process flow according to the present embodiment.

As shown in FIG. 13, in the present embodiment, the process up to step S919 (see FIG. 9 and FIG. 10) is similar to that in the first embodiment described above. Specifically, also in the present embodiment, the permission prompt is displayed in the display area 402 (see FIG. 4) of the screen 400 and data access is protected by having the user select a device for which connection of the web USB is permitted.

In the present embodiment, if the browser 325 notifies the device 131 about the use mode in step S919, the access control unit 333 of the device 131 determines whether or not the use mode requires the additional permission operation on the device body side (S1201). For example, if the service mode is used, it may be possible to require the additional permission operation because the higher data access authority is given to the user. As another example, in either the user mode or the service mode, it may be possible to request the additional permission operation during data access to the device 131.

If it is determined in step S1201 that the additional permission operation is not requested, the access permission process ends, and the procedure following step S920 in the first embodiment described above is executed.

In contrast, if it is determined in step S1201 that the additional permission operation is requested, the access control unit 333 of the device 131 requests the additional permission operation in the device body from the browser 325 (S1202).

The browser 325 prompts the user to perform an operation for access permission by displaying the screen 1100 (see FIG. 12A) that requests the additional access permission operation (S1203).

The user operates the operation panel 1000 (see FIG. 11A) or the touch panel 1010 (see FIG. 11B) provided in the device 131 in accordance with the request displayed on the browser 325 to execute the additional permission operation (S1204).

Subsequently, the access control unit 333 sets the use mode of the communication session presently being performed (S920), and this setting result is notified to the browser 325 (S921).

Upon receipt of this notification, the browser 325 displays the screen 1110 (see FIG. 12B) indicating that the access has been permitted (S1205).

Subsequently, a process similar to that of step S922 and the subsequent steps in the first embodiment, in other words, the process using the diagnosis application screen (see FIG. 5 to FIG. 8B) is executed.

The present embodiment provides the following effects, in addition to the first embodiment described above.

If only the connection permission prompt specified in the Web USB standard is used, the user may accidentally press the connection permission prompt displayed by a malicious website. In this case, there is a risk that the malicious website can freely access the data of a device that is mistakenly connected.

In contrast, in the present embodiment, since the additional permission operation is executed on the main body side of the device 131, only a true user near the device can provide a data access permission from the website. Additionally, as illustrated in the description of the service mode, data access can be enabled only when maintaining the device by requesting an additional authorization operation during access to data that requires a higher access level.

Therefore, according to the present embodiment, the reliability of the access permission can be enhanced.

Note that, in the present embodiment, although a procedure for executing the additional permission operation in the device 131 after the connection from the browser 325 to the device 131 starts has been described, it may be possible to freely set the order of the connection start and the additional permission operation. Specifically, a procedure may be used in which an additional authorization operation is executed by the device so as to be in a connection start waiting state at the device side and a connection is established after a connection is requested from the browser.

Third Embodiment

The third embodiment of the present invention will be described by using FIG. 14 to FIG. 18. The system configuration and the network configuration of the device diagnostic web system, and the hardware configuration and the software configuration of the computer 111, the server 121, and the device 131 according to the present embodiment are similar to those in the first embodiment described above.

The present embodiment is an example in which a maintenance report generation function is added to the system according to the above-described first embodiment.

Figure 14:
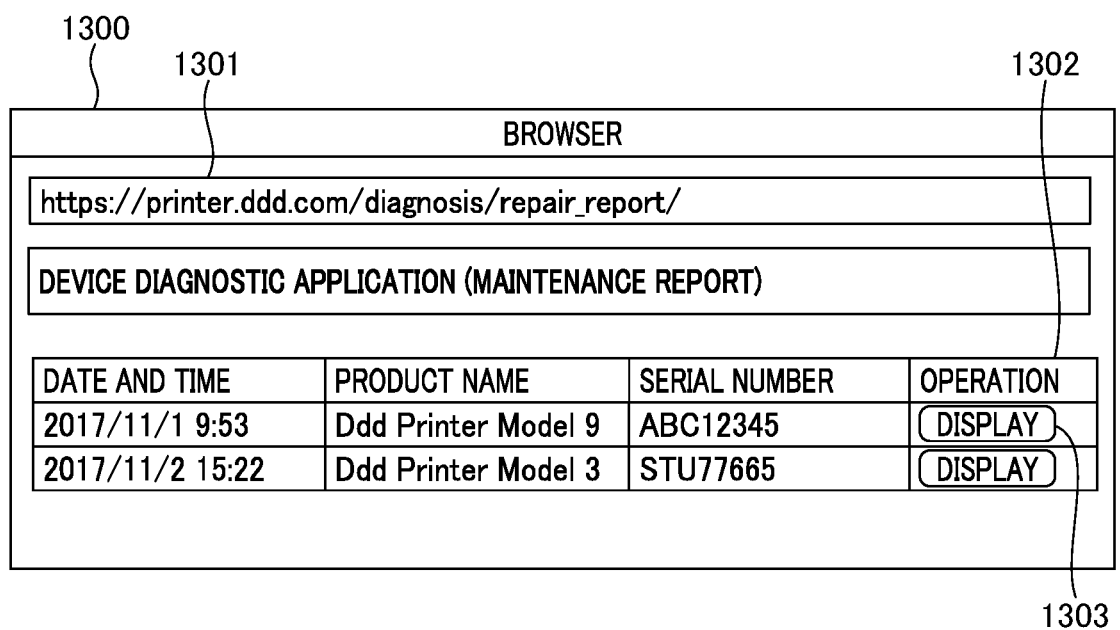
FIG. 14 is a conceptual diagram illustrating an example of a browser display screen during execution of a diagnostic web application according to the third embodiment.

FIG. 14 and FIG. 15 are screen examples of the maintenance report displayed on the browser 325.

A screen 1300 shown in FIG. 14 is a screen that displays a maintenance report list.

In this screen 1300, the URL of the website for viewing the maintenance report is input in a URL input and search field 1301.

Additionally, a maintenance report list 1302 is displayed on this screen 1300.

Then each display item of this maintenance report list 1302 is provided with link buttons 1303 (a button displayed as "display") for selecting and displaying the maintenance report.

A screen 1400 shown in FIG. 15 is a detail display screen of one maintenance report selected from the maintenance report list.

The screen 1400 displays device information such as date and time of maintenance, and a product name and a serial number of the device. Furthermore, the screen 1400 displays a device state and a setting value before a setting change, and a device state and a setting value after a setting change. By comparison between a before and after setting change, it is possible to report which setting value has been changed in maintenance for solving the problem that has occurred.

Figure 16:
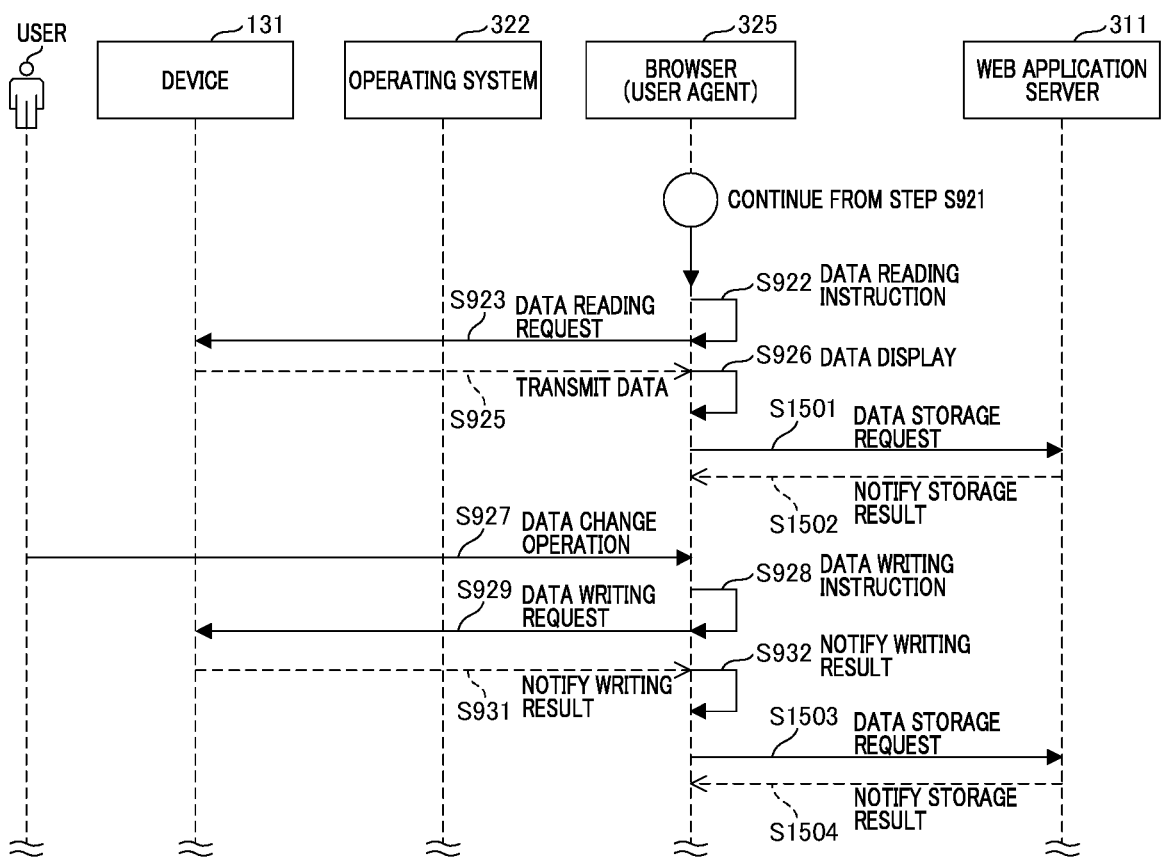
FIG. 16 is a flowchart for explaining an execution process of the diagnostic web application according to the third embodiment.

FIG. 16 and FIG. 17 are flowcharts that explain the process that stores and outputs the maintenance report.

First, a process for storing a maintenance report will be described with reference to FIG. 16.

As shown in FIG. 16, in the present embodiment, the process up to step S921 (see FIG. 9 and FIG. 10) is similar to that in the first embodiment described above. That is, the use mode is set between the browser 325 and the device 131.

Further, also in the present embodiment, as in the above-described first embodiment, a process of reading data from the device 131 is executed (S922 to S926).

Then, the browser 325 requests the web API 312 of the web application server 311 to store the data read from the device 131 by executing a program in Java Script 326 (S1501).

The web application server 311 stores the data read from the device 131 in the data store 314, and then returns a response to the browser 325 (S1502).

Subsequently, as in the first embodiment, upon the pressing of the button 611 or the button 821 on the screen 610 or 820 by the user, the operation result is transmitted to the browser 325 (S927), and the data change processing from steps S928 to S932 are executed.

Subsequently, the browser 325 again requests the Web API 312 of the Web application server 311 to store the data written to the device 131 by executing the program in Java Script 326 (S1503).

The web application server 311 stores the data read from the device 131 in the data store 314 and returns a response (S1504).

Thus, the data before and after change can be stored respectively.

Next, with reference to FIG. 17, a process for outputting a maintenance report will be described.

First, the user inputs a predetermined URL in the URL input and search field 1301 of the browser 325 or the like to display a web page for browsing a maintenance report (S1551, FIG. 14).

Subsequently, the browser 325 transmits a web content request to the web application server 311 (S1552).

The web application server 311 transmits content such as HTML/JavaScript that configures a web user interface of the maintenance report (S1553) as a response to the request.

The browser 325 requests the web API 312 of the web application server 311 to transmit the maintenance report list by executing the program in the Java Script 326 (S1554).

The web application server 311 reads out necessary data from the data store 314 by issuing a query, generates a maintenance report list by using the read data, and transmits the list to the browser 325 (S1555).

The browser 325 displays a maintenance report list 1302 received from the web application server 311 (S1556, FIG. 14).

The user selects a desired maintenance report by pressing one of the link buttons 1303 from the maintenance report list 1302 of the screen 1300 (S1557).

The browser 325 requests the web API 312 of the web application server 311 to acquire the maintenance report details by executing a program in Java Script 326 (S1558).

The web application server 311 reads necessary data from the data store 314 by issuing a query, generates details of the maintenance report by using the read data, and transmits the details to the browser 325 (S1559).

The browser 325 displays the screen 1400 illustrating the details of the maintenance report received from the web application server 311 (S1560).

Thus, the user can view the report using the stored data in the data store 314.

The present embodiment provides the following effects in addition to the first embodiment described above.

Conventionally, if the computer 111 and the device 131 are communicatively connected by a local connection means such as the USB cable 135, data acquired by the local connection must be transmitted separately by using a communication connection between the computer 111 and the server 121.

In contrast, in the present embodiment, the stored data of the device 131 is collected in the server 121 via the browser 325 by using the fact that the Web USB protocol enables direct access from the web application of the server 121 to the device 131. Therefore, according to the present embodiment, it is possible to automatically store a record of the device maintenance work on the server side, generate a maintenance report, and have the user view the report.

Next, another navigation method to the diagnostic web application will be described with reference to FIG. 18. Here, as another navigation method, a method will be described in which minimum functions are realized by the local web user interface of the device 131 and advanced functions are realized by the web application provided by the web server.

In FIG. 18, screen 1600 is an example in which the local web UI provided by the web server provided in the device 131 is displayed in the browser 325.

In the case where the device 131 is successfully connected to the LAN 105, the computer 111 can use the local web UI of the device 131. The local web UI 1600 can easily display device information, use status, and the like by executing software incorporated in the device 131.

Here, a situation where an error occurs in the color calibration of the printer will be described as an example. In this case, even if there is a diagnostic process that cannot be executed by the local web UI, the user can be guided to the screen and function provided by the web application server 311 by providing a URL link 1601 to the diagnostic web application.

Although each embodiment of the present invention has been described by taking the case of locally connecting the computer 111 and the device 131 through a Web USB connection as an example, the present invention can be applied if local connection that is not through a network is performed even in other connection methods, for example, a Web Bluetooth connection.

Other Embodiments

Embodiment (s) of the present invention can be realized by a computer of a system or apparatus that reads out and executes computer executable instructions (e.g., one or more programs) recorded on a storage medium (which may also be relied upon as anon-transitory computer-readable storage medium' to perform the functions or one or more of the above-described embodiments (s) and/or that includes one or more circuits (e.g., application specific integrated circuits (ASIC)) for performing the functions of one or more of the above-described embodiment (s), and by a method performed by the computer of the system or apparatus by, for example, reading out and executing the computer executable instructions from the storage medium to perform The computer may comprise one or more processors or functions of one or more of the above or more controlling the one or more circuits to perform the one or more of the functions or one of the more than the above described embodiment (s). (e.g., central processing unit (CPU), micro processing unit (MPU) and may include a network of separate computers or separate processors to read out and execute the computer executable instructions. The computer executable instructions may be provided to the computer, for The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to an exemplars embodiment, it is to be understood that the invention is not limited to the disclosed exemplars. and equivalent structures and functions.

This application claims the benefit of Japanese Patent Application No. 2018-169806, filed Sep. 11, 2018, which are here by incorporated by reference wherein in its entity.

What is claimed is:

1. A device diagnostic web system including an information processing apparatus that executes a web browser, and a device, wherein:
   the information processing apparatus comprises:
   a memory storing instructions; and
   a processor executing the instructions stored in the memory causing the information processing apparatus to:
   display a confirmation screen by the web browser when a web application is executed in the web browser, wherein the confirmation screen is a screen for confirming whether or not the web application is to be permitted to access the device after the information processing apparatus and the device are connected via USB or Bluetooth and the confirmation screen includes information of the web application and identification information of the device; and
   acquire device information from the device in accordance with a script corresponding to the web application permitted via the confirmation screen;
   wherein the web application provides a function for diagnosing the device by using the acquired device information, and
   wherein, on the confirmation screen, access to the device as a diagnostic target by the function is to be confirmed.

2. The device diagnostic web system according to claim 1, wherein the instructions stored in the memory cause the information processing apparatus to write data in the device in accordance with the script corresponding to the web application in response to an operation of a diagnostic screen provided by the function for diagnosing the device.

3. The device diagnostic web system according to claim 2, wherein a user's authority is determined in accordance with the script corresponding to the web application, and the diagnostic screen is provided in accordance with the determined user's authority.

4. The device diagnostic web system according to claim 1, wherein the instructions stored in the memory cause the information processing apparatus to confirm whether or not the web application is to be permitted to access the device by an operation on the device.

5. The device diagnostic web system according to claim 1, further including a web application server configured to provide the web application to the information processing apparatus that has been accessed based on the user's operation.

6. The device diagnostic web system according to claim 1,
wherein the instructions stored in the memory cause the information processing apparatus to transmit a part or all of the information included in a diagnostic information to the web application server and makes the web application server store the information.

7. A method for diagnosing a device using a device diagnostic web system which includes an information processing apparatus that executes a web browser, and a device, the method comprising:
displaying a confirmation screen by the web browser when a web application is executed in the web browser, wherein the confirmation screen is a screen for confirming which whether or not the web application is to be permitted to access the device after the information processing apparatus and the device are connected via USB or Bluetooth and the confirmation screen includes information of the web application and identification information of the device; and
acquiring device information from the device in accordance with a script corresponding to the web application permitted via the confirmation screen;
wherein the web application provides a function for diagnosing the device by using the acquired device information, and wherein, on the confirmation screen, access to the device as a diagnosing target by the function is to be confirmed.

8. A non-transitory storage medium on which is stored a computer program for making a computer execute a method for diagnosing a device using a device diagnostic web system which includes an information processing apparatus that executes a web browser, and a device, the method comprising:
displaying a confirmation screen by the web browser when a web application is executed in the web browser, wherein the confirmation screen is a screen for confirming whether or not the web application is to be permitted to access the device after the information processing apparatus and the device are connected via USB or Bluetooth and the confirmation screen includes information of the web application and identification information of the device; and
acquiring device information from the device in accordance with a script corresponding to the web application permitted via the confirmation screen;
wherein the web provides a function for diagnosing the device by using the acquired device information, and
wherein, on the confirmation screen, access to the device as a diagnosing target by the function is to be confirmed.

* * * * *